Figure 1:
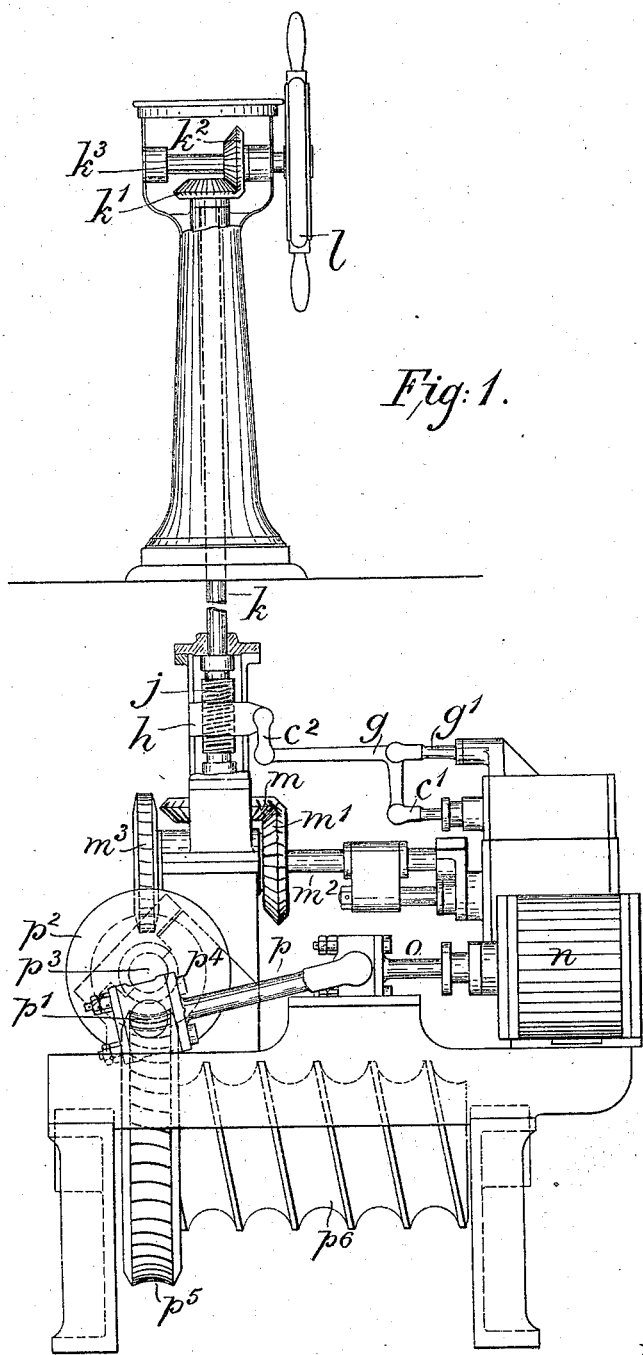

(No Model.) 4 Sheets—Sheet 2.
W. R. G. HAY.
CONTROLLING VALVE APPARATUS FOR STEERING GEAR.
No. 558,806. Patented Apr. 21, 1896.
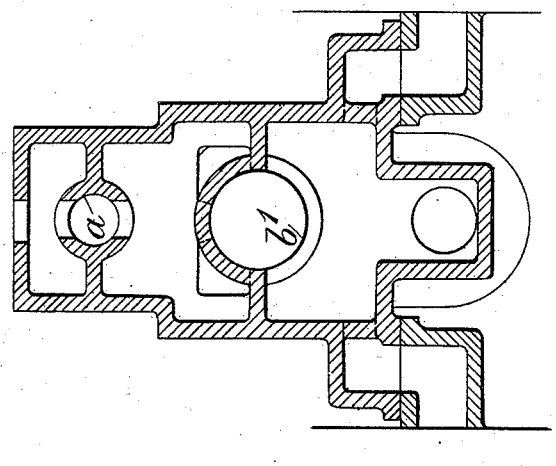
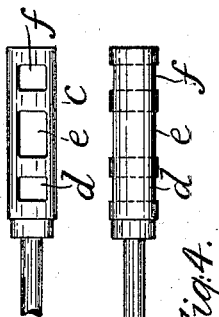
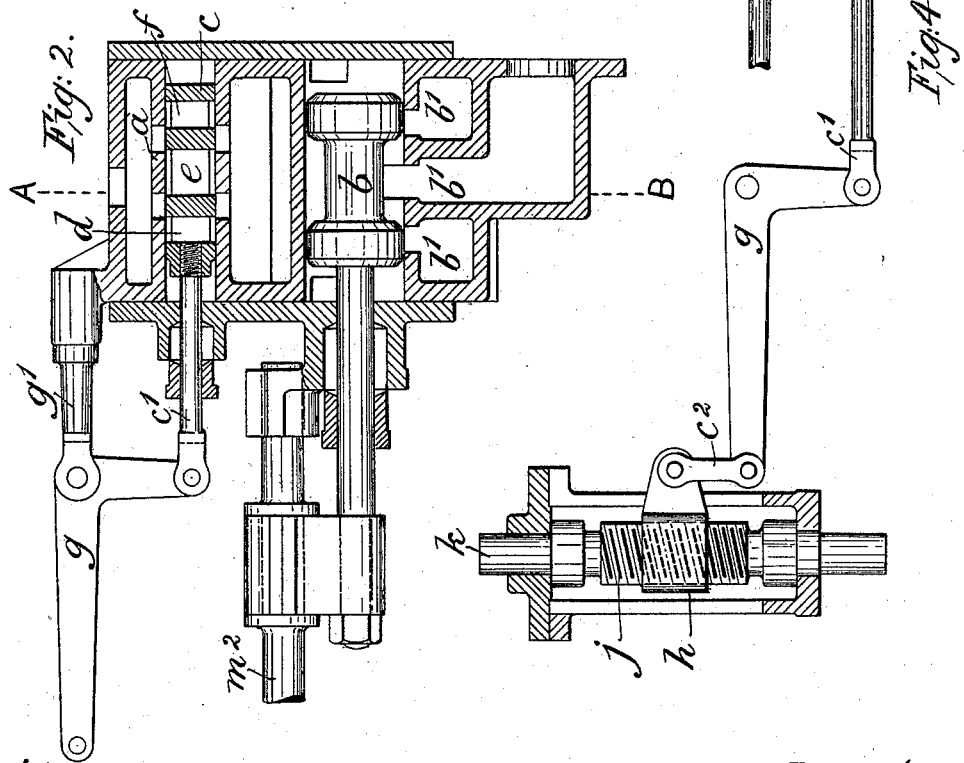
Witnesses.
Inventor.
William R. G. Hay.
By James L. Norris,
Atty.

(No Model.) 4 Sheets—Sheet 3.

W. R. G. HAY.
CONTROLLING VALVE APPARATUS FOR STEERING GEAR.

No. 558,806. Patented Apr. 21, 1896.

Witnesses.

Inventor.
William R. G. Hay.

(No Model.) 4 Sheets—Sheet 4.
W. R. G. HAY.
CONTROLLING VALVE APPARATUS FOR STEERING GEAR.
No. 558,806. Patented Apr. 21, 1896.
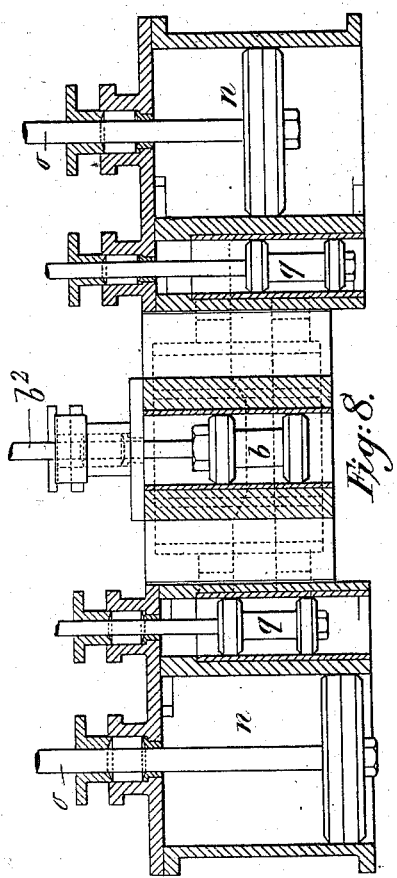
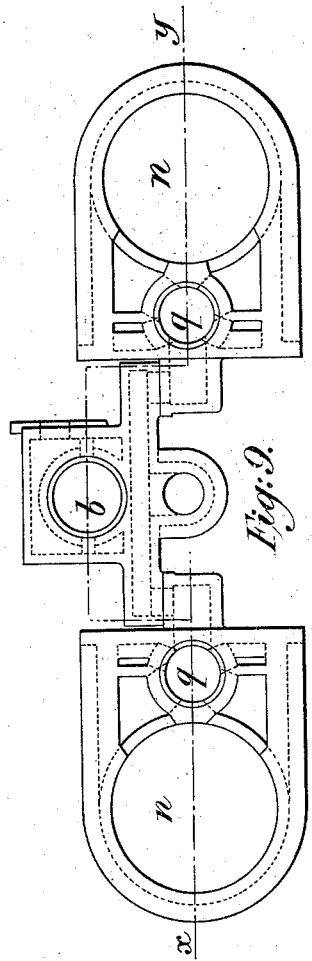

UNITED STATES PATENT OFFICE.

WILLIAM ROBERT GARDEN HAY, OF LONDON, ENGLAND.

CONTROLLING-VALVE APPARATUS FOR STEERING-GEAR.

SPECIFICATION forming part of Letters Patent No. 558,806, dated April 21, 1896.

Application filed August 19, 1895. Serial No. 559,841. (No model.)

*To all whom it may concern:*

Be it known that I, WILLIAM ROBERT GARDEN HAY, a subject of the Queen of Great Britain, of Garford Street Engineering Works, Garford Street, Poplar, London, in the county of Middlesex, England, have invented new and useful Improvements in Controlling-Valve Apparatus for Steam Steering-Gear and other Machinery Capable of Being Similarly Controlled, of which the following is a specification.

This invention relates to improvements in valve apparatus for effecting control of the steam or other fluid employed as the motive power for the machinery, such as steam steering-gear and other machinery capable of being similarly controlled, and has for its object the economization of the steam or fluid employed and the better control thereof under varying conditions.

As an example, in using the improved controlling-valve $c$ in connection with a steam steering apparatus of the character known as "Davis's steering-gear" the improved valve is applied over or in other relation to the ordinary controlling-valve $b$ and so as to control the amount of steam allowed to pass to that ordinary valve, as more or less steam-power is required as the helm is worked over more or less either way, regulating the power to the work to be accomplished. The form of the moving part of this new valve $c$ may vary—that is to say, it may be of piston form or of the throttle-valve or other type adapted to the purpose, in either case it forming, with the ports $b'$, coöperating with it, a governor to the steam supply.

Suppose the new valve $c$ to be of cylindrical piston form, having one, two, three, or other number of piston parts strung or formed on one central rod which actuates them in unison relatively to a corresponding number and arrangement of parts or passages for the steam communicating with suitable channels of inlet and outlet to the ordinary controlling-valve $b$. This piston-head or piston-heads is or are so arranged that they can never entirely close their ports, but can only restrict or increase the flow, and their movement is governed by the movements of the rudder-actuating mechanism by means of suitable connections. For instance, the controlling-shaft worked by the steam steering-wheel by suitable gear may operate a screw-stem carrying a traveling screw nut or part, and this part is by a suitable connection caused to reciprocate the rod of the piston or multiple piston-valve referred to, and in a corresponding manner other forms of the new controlling-valve are operated.

The invention is equally applicable to other forms of steering apparatus and to other machinery working under similar conditions of variability of load or intermittency of movement in working.

In operation, say with a Davis's steering-gear worked by steam, the following may be stated as among the advantages attained by the use of the invention: A great saving of steam is effected; under ordinary conditions the steam is adjusted to and varies relatively with the load; the engine is kept more under control, and therefore a truer course can be kept; shocks on the admission of steam are lessened, and consequently the engine will be run more smoothly.

In practice, when the tiller and the steering-engine are alike "amidships" and it is required to put the helm over, steam is supplied by the engine-controlling valve $b$, worked by the steam steering-wheel, and as the helm goes over an increased supply of steam is allowed to pass by the new governing-valve, which valve is regulated by the "telltale" or shutting-off gear of the steering-engine, and to bring the helm back to "amidships" a reverse action takes place and the new governing-valve $c$ gradually closes and lessens the supply of steam as the helm comes "amidships" and the load decreases.

Figure 6:
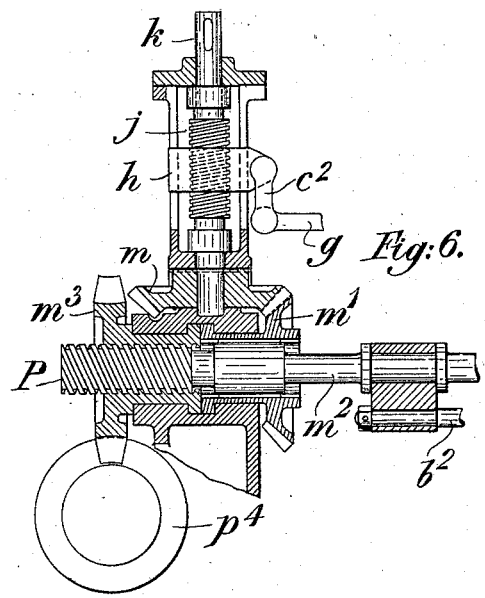
Figure 7:
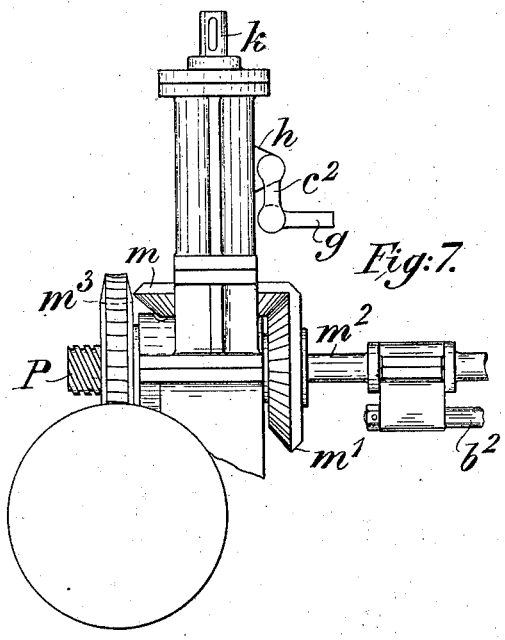

In the drawings, Figure 1 is a front elevation of the invention as applied to a steam steering apparatus. Fig. 2 shows a sectional elevation of the parts more immediately relating to the invention, (shown in Fig. 1 and drawn to a larger scale,) illustrating, respectively, the ordinary controlling-valve $b$ and the automatic regulating-valve $c$. Fig. 3 is a section drawn to the same scale as and taken upon the line A B of Fig. 2. Fig. 4 is a view of the controlling-valve $c$ and parts connecting same with the shutting-off-screw parts and drawn to the same scale as Fig. 2. Fig. 5 is a like view of the valve $c$ to that shown in the preceding figure, but taken at a right angle thereto. Fig. 6 is a sectional view of the mechanism for actuating the valve-rod $m^2$, and Fig. 7 is a view in elevation of the same parts. Fig. 8 is a horizontal section on the line $x\,y$ of Fig. 9, showing an ordinary arrangement of the cylinders and valves of a Davis steering-gear, to which the present invention is applicable. Fig. 9 is an end elevation of the same with cylinder-covers removed.

Referring to the drawings, $a$, Figs. 2 and 3, designates the seating for the auxiliary controlling-valve $c$, and $b$ the main controlling, starting, and reversing valve, with its ports $b'$.

The valve $c$ is formed with two or more parts having through-ports $d\,e\,f$. This valve is worked by the lever $g$ (here shown of bell-crank form) and has seating $a$. The opposite end of this bell-crank lever to that connected to the valve-stem $c'$ is linked by links, one of which is shown at $c^2$, to the threaded telltale-nut $h$, which engages the thread of the screw $j$, which screw is mounted on the vertical shaft $k$, carrying the bevel gear-wheel $k'$, Fig. 1, which engages with the gear-wheel $k^2$, mounted on the cross-shaft $k^3$, carrying the steering-wheel $l$ and being operated for its rotation by said wheel.

$g'$, Figs. 1 and 2, is a rod forming a fulcrum for the cranked arm $g$. The position of the telltale-nut $h$ relatively to the ends of the screw $j\,j$ and other surrounding parts that are fixed indicates the position of the rudder, such as "amidships" or more or less "hard over."

The lower end of the shaft $k$ carries a bevel gear-wheel $m$, which gears with and rotates a gear-wheel $m'$, keyed on a valve-rod $m^2$, that is coupled to the stem $b^2$ of the controlling-valve $b$. The end of rod $m^2$ has cast on it a worm P, geared to the main engine worm-shaft. This gearing effects the well-known hunting motion. The steering-wheel turns on steam to the engine by means of shaft $k$ and bevel-wheels $m\,m'$, (the latter sliding on keys,) and the engine starts and works back the screw P by the worm-wheel $m^3$ thereon, thus shutting itself off automatically.

In Figs. 6 and 7 the shaft $k$ and bevel-wheels $m\,m'$ and the rod $m^2$, on which is formed screw P, with nut and worm-wheel $m^3$, are the parts of old form of construction which work the controlling and reversing valve $b$.

In the old form of construction, as in a steering apparatus worked by steering-wheel, the steering-wheel is connected in a suitable manner to the shaft $k$, and full steam is turned on by revolving said shaft $k$, gearing, by means of bevel-wheels $m\,m'$, with the valve-rod $m^2$. This rod $m^2$ being provided with screw-thread P, a to-and-fro motion is produced and full steam is admitted to the cylinders $n\,n$, Figs. 1, 8, and 9. $p^4$ is a worm on the engine-shaft $p^3$ and revolves and turns round the nut and worm-wheel $m^3$, which returns the screw P and with it the valve $b$ to its original position. With this arrangement of gearing, therefore, full steam is admitted into the cylinder in whatever position the rudder may be.

Under the present invention valve-stem $c'$ and valve $c$, Fig. 2, are driven by crank-lever $g$ and link $c^2$ from the telltale-nut $h$ on screw-thread $j$ of the shaft $k$. By the present invention, therefore, the supply of steam to the valve $b$ by way of the controlling-valve $c$ is increased or diminished in such way that steam is admitted only in proportion to the work required, or, what is the same thing, to the number of degrees the helm lies over from "amidships." When the telltale-nut $h$ is at its extreme position on the screw-thread $j$ at either end, the helm is "hard over" and the steam-inlet of valve $c$, Fig. 2, is full open, supplying steam to valve $b$.

$n\,n$, Figs. 1, 8, and 9, represent a pair of usual cylinders for steam with piston and piston-rod $o$, to which is centered the connecting-rod $p$, Fig. 1, attached to the eccentric-pin $p'$, projecting from the face of the disk $p^2$ on the shaft $p^3$, Figs. 1 and 6, which forms the main driving-shaft and carries the worm $p^4$. (Shown by dotted lines in Fig. 1.) This worm engages the worm-wheel $p^5$, mounted on one end of the spirally-grooved barrel $p^6$, around which is wrapped the steering-chain actuating the rudder.

The main controlling-valve $b$ is used for starting and reversing the engine and supplies steam to either steam-cylinder $n$, Figs. 8 and 9, as required, through the cylinder-valves $q$, which are ordinary piston-valves. Steam is admitted by the main valve $b$ to the cylinder-valves $q$, respectively, and is thence distributed to either the top or bottom of the steam-cylinders $n\,n$ in accordance with the movement of eccentrics by which the valves $q$ are worked in the ordinary way. By the arrangement of the main controlling, starting, and reversing valve $b$ and auxiliary valve $c$ and their operating devices only a small quantity of steam is supplied when the rudder is near the "amidships" position, and the volume of steam is increased automatically as the engine runs and the helm gets "hard over." The speed at which the engine runs remains uniform while the greater pressure of steam supplied by automatic valve-action enables more work to be performed by the cylinders as increase of power is called for in the movement of the helm in going "hard over." It will be observed also that the action of the valve $c$ is sympathetic with the movement of the rudder, being controlled as it is from a part, such as screw-thread $j$ on shaft $k$, with which the movement of the rudder is consonant.

In the ordinary arrangements of steam steering-gear of the character shown, but without my present invention, it has been necessary to turn on the full supply of steam by the movement of the steering-wheel to perform any operation of the rudder, whether the operation was the lighter one of starting from "amidships" or the heavier one of putting the helm "hard over," and waste of steam was a necessary consequence, the full flood of steam supplied being in the former case in excess of requirement and regardless of the power actually needed.

By means of the present invention an auxiliary regulation of the supply of steam supplied to the main controlling-valve is provided, whose movement being obtained by connection with the telltale the supply of steam is enabled to be proportioned to the amount of work actually to be performed. As the telltale moves from "amidships" toward "hard over" at either side the connections to the auxiliary regulating-valve $c$ cause that valve to increase the supply of steam relatively to the increase of strain on the rudder to be overcome.

I claim—

1. In steam steering apparatus, the combination with a main controlling, starting and reversing valve, of an auxiliary valve $c$ actuated by the movements of a telltale part moved in consonance with the movements of the helm, to control the supply of steam to said main valve according to the position of the helm and to regulate the supply of steam to the amount of resistance to be overcome, substantially as described.

2. The combination with the main steam-supply and valve-controlled parts of steam steering and similarly-controlled machinery, of an auxiliary valve to control the supply of steam to the main-valve mechanism, and a telltale part actuated in consonance with the movements of the helm and from which the said auxiliary valve is automatically actuated, substantially as described.

3. The combination with the main valve for controlling steam-supply to the piston-cylinders in a steam steering apparatus, and a shaft or axis through which said valve is operated, of a telltale part moved with said shaft or axis, in consonance with the movements of the helm, and an auxiliary controlling-valve and its connections actuated automatically from said telltale part, to control the supply of steam to the main valve according to the position of the helm and the amount of resistance to be overcome, substantially as described.

In testimony whereof I, the said WILLIAM ROBERT GARDEN HAY, have hereunto set my hand this 8th day of August, 1895.

WILLIAM ROBERT GARDEN HAY.

Witnesses:
   ALFRED G. BROOKES,
   JOHN C. HARE.